April 19, 1955     F. H. BEST     2,706,366
METHOD OF CONSTRUCTING A HELIX ASSEMBLY
Filed Nov. 25, 1950     2 Sheets-Sheet 1
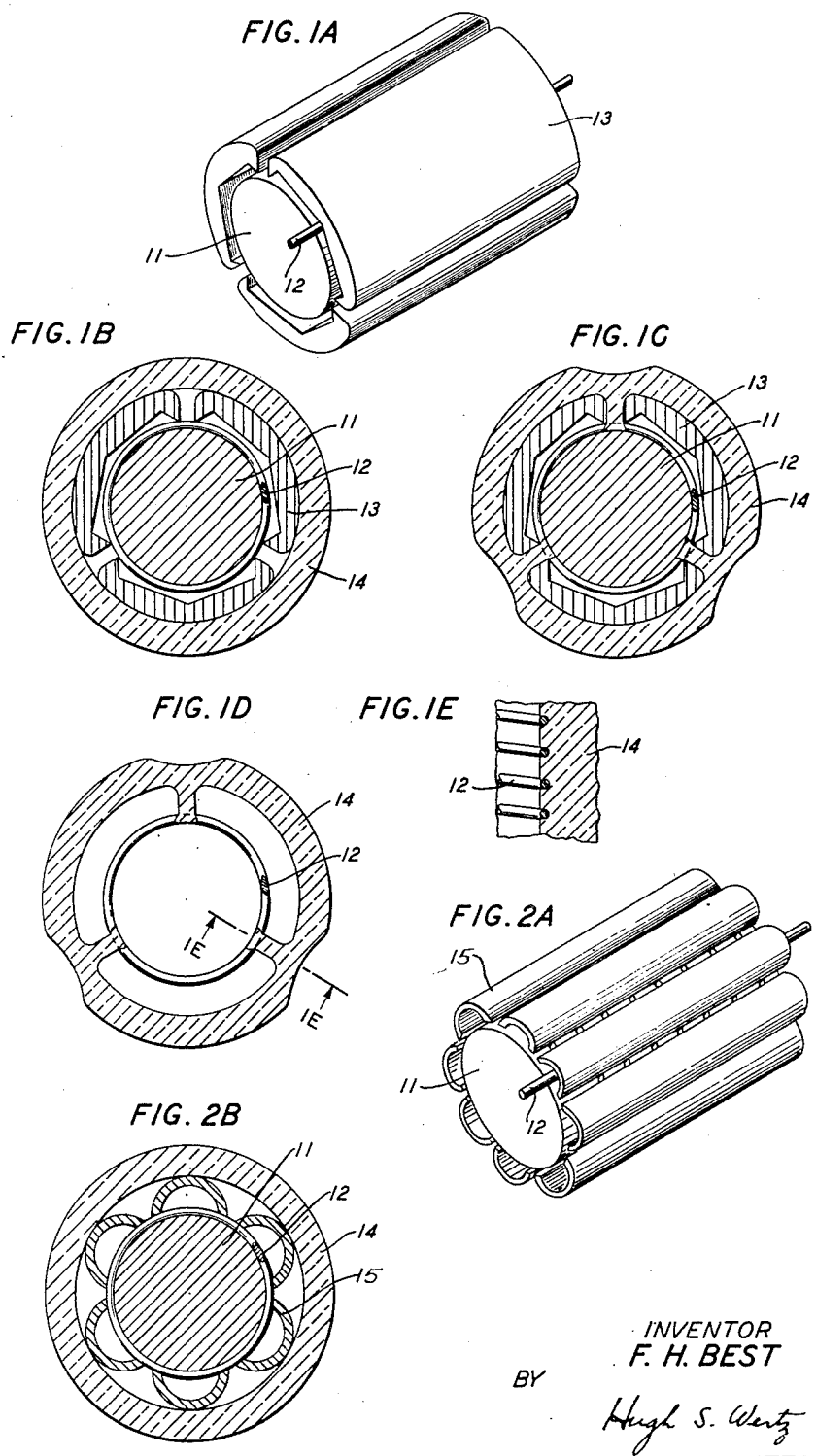
INVENTOR
F. H. BEST
BY
Hugh S. Wertz
ATTORNEY April 19, 1955    F. H. BEST    2,706,366
METHOD OF CONSTRUCTING A HELIX ASSEMBLY
Filed Nov. 25, 1950    2 Sheets-Sheet 2

INVENTOR
F. H. BEST
BY
Hugh S. Wertz
ATTORNEY 2,706,366
Patented Apr. 19, 1955

2,706,366

METHOD OF CONSTRUCTING A HELIX ASSEMBLY

Fred H. Best, Mountainside, N. J., assignor to Bell Telephone Laboratories, Incorporated, New York, N. Y., a corporation of New York Application November 25, 1950, Serial No. 197,589

3 Claims. (Cl. 49—81)

This invention relates to supports for wire components and methods for their manufacture and more particularly but not exclusively to the support of wire helices in glass envelopes.

The use of higher and higher frequencies in the electronic art has imposed a need for smaller and smaller components to be utilized in devices operating at such frequencies. In particular, it is often necessary to utilize fine wire components which, despite their fineness, must nevertheless be firmly and accurately supported. For example, in helix type traveling wave tubes for use with microwaves there are utilized fine wire helices which must be accurately wound and firmly supported in the tube structure. A general object of this invention is to facilitate the use and assembly of such small components.

A more specific object is to improve the methods and structure for supporting firmly and accurately wire helices in glass and similar non-conducting material. By way of example, for purposes of illustration, the invention is hereinafter described with reference to the specific problem of maintaining a fine wire helix in rigid and accurate alignment in a traveling wave tube. However, it will be apparent from the following description that other arrangements and applications can be devised by one skilled in the art without departing from the spirit and scope of the present invention.

In helix-type traveling wave tubes to be used at microwave frequencies, there are required helices wound of very fine wire and with very small pitches. For example, helices may be desired of wire of a few mils diameter and wound with a pitch of a few mils. Moreover, for optimum operation of such tubes, it is important that the helix conform quite closely both in pitch and alignment to a predetermined configuration. To realize this end, it is not only important that the helix be accurately wound but it is necessary that rigid support be provided the helix if the desired configuration is to be maintained during tube operation. Moreover, because of the nature of the use of such helices, it is important that the support utilized not appreciably interfere with the easy flow of electrons through the helix.

In accordance with the present invention, there is provided a wire coil which is firmly locked within a tubular envelope.

In a specific application of the invention, the process of supporting the helix comprises the steps of winding a wire conductor on a temporary support in a manner to provide to a high degree of accuracy the helical configuration desired, placing masks along the length of the helix for covering the portion thereof not to be supported in the glass, enclosing the assembly in a close fitting glass envelope, evacuating the envelope to create a pressure differential between the inside and outside thereof, heating this assembly until the pressure differential forces the softened glass around the exposed portions of the helix in a locking position and finally removing the support and mask without disturbing the envelope or helix. In this manner there is provided a helix which is rigidly supported along its length at various points around its circumference by a glass envelope.

The invention will be better understood by reference to the following more detailed description taken in connection with the accompanying drawings which form a part thereof and in which:

Figs. 1A through 1E show various steps in an exemplary application of the invention, of which Fig. 1A shows, in perspective, an assembly comprising a helix wound on a core support and masking details, Fig. 1B shows a cross section of this assembly enclosed in a close fitting glass envelope, Fig. 1C shows this assembly in cross section after portions of the glass envelope have been locked around portions of the helix, Fig. 1D illustrates a cross section of the resultant after removal of the core support and masking details and Fig. 1E is a longitudinal section which illustrates the locking of the coil by the glass.

Figs. 2A through 2D illustrate in the manner of Figs. 1A through 1D, respectively, the process of the invention, applied to another form of supporting structure;

Figs. 3A through 3D illustrate the manufacture of a helix which is supported completely around its circumference, of which Fig. 3A shows a radial cross section of an assembly comprising a wire coil wound on a tubular support enclosed in a tightly fitting envelope and Figs. 3B through 3D show longitudinal cross sections of this assembly in subsequent stages of the process.

Figure 2C:
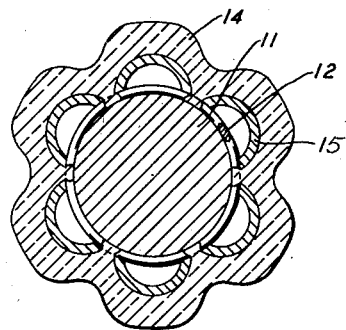
Figure 2D:
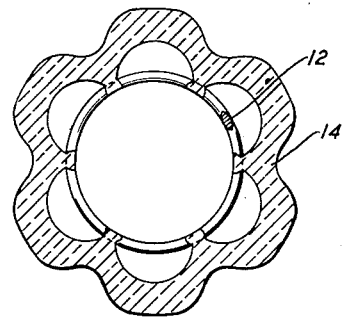
Figure 3A:
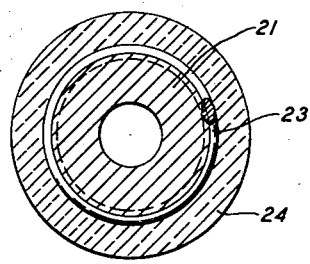
Figure 3B:
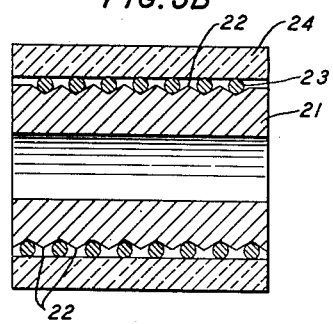
Figure 3C:
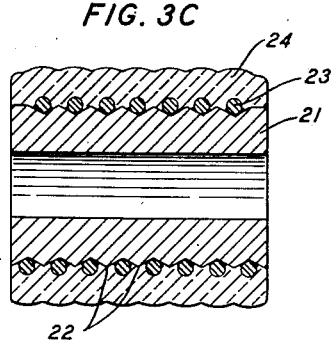
Figure 3D:
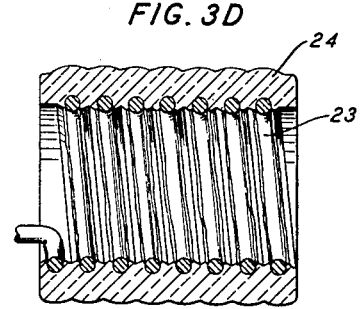
Figure 4:
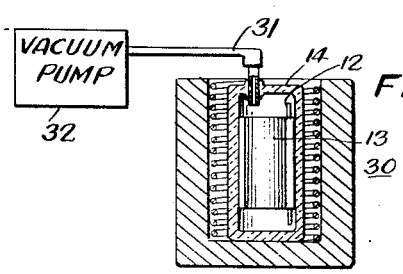

Fig. 4 diagrammatically illustrates the intermediate step in the process illustrated in Figs. 1A through 1D, 2A through 2D, and 3A through 3D, of creating a pressure differential between the inside and outside of the envelope and applying heat to soften it.

To provide a helix assembly in accordance with the invention, the wire conductor is first wound on a firm temporary supporting structure which may comprise a rod or tube, and the ends of the conductor are welded to the structure. The conductor is wound in a manner to provide the desired helical configuration, and the supporting structure serves as a mandrel for achieving this configuration. In addition, it is important that the supporting structure be of a material which is soluble in a solvent which does not affect the conductor material. In practice, it is convenient to use a supporting structure made of Kovar. Silver, copper, gold, tungsten, platinum, and molybdenum are among the typical materials which can be used for the wire conductor. Then masking details are placed against the helix, extending along the supporting structure, and fastened in place there. Various configurations can be chosen for these details, and the proper choice depends on the extent of support necessary and the amount of free space desired for the electron flow along the outside of the helix. As will be appreciated more fully hereinafter, the configuration of these masking details determines the free space available along the outside of the helix. These details should be of a material which is soluble in the same way as the supporting structure. In practice, it is convenient to utilize Kovar for these details also. There is shown in Figs. 1 and 2 assemblies, each of which includes the temporary supporting structure 11, the helix 12, and the masking details 13 and 15, respectively. The assembly shown in Fig. 1A is one especially adapted for small helices which can be held with sufficient rigidity by support at only three points of the circumference. The assembly shown in Fig. 2A is one adapted for larger helices which require support at a larger number of points along the circumference for the requisite rigidity. It can be appreciated that these are just two of a very large number of possible masking configurations. Thereafter, this assembly is then enclosed in an envelope 14 which just clears the masking details and which is composed of the material with which it is intended to support the helix. This material needs to be one which, like that of the helix, is insoluble in the solvent used for dissolving the supporting and masking structure. Envelopes of hard glass are most convenient for this application, particularly when used in conjunction with Kovar supporting and masking structures because of the similarity therewith of temperature expansivity coefficients. Figs. 1B and 2B show the resultants when the assemblies of Figs. 1A and 2A are enclosed in the glass envelope 14. Thereafter, as shown in Fig. 4, one end of the glass envelope is sealed off, and the other end is connected by a short length of tubing 31 to a vacuum pump 32. When the pump is in operation and there is created a pressure differential between the outside and inside of the glass envelope 14, the assembly is lowered into a vertical oven 30 and is heated to a temperature sufficient to make the glass envelope material quite soft. When a sufficiently high temperature is reached, the pressure differential causes the glass to be pushed close around and fused or locked with the exposed portions of the helix 12, the supporting structure 11, and masking structure 13. After cooling and hardening, the assembly is ground off at each end and there is left the assembly which is shown in Figs. 1C and 2C, respectively, for the two cases shown in Figs. 1A and 2A.

At this point, it can be appreciated that it will be advantageous to utilize an envelope material whose temperature expansivity coefficients are closely similar to that of the supporting and masking structure so that stresses may be avoided in cooling. It is less important that the expansivity coefficients of the helix material be similar to those of the envelope material because of the much smaller dimensions of the helix. For some very simple configurations, it may be possible to utilize a structure having a temperature coefficient which is larger than that of the glass, so that on cooling the supporting structure will separate easily from the glass and helix to facilitate removal. In general, however, there still remains the step of removing the supporting and masking structures. This is most conveniently done by dissolving these with an appropriate solvent although other expedients may be feasible. If Kovar is used for these structures, the etching can be done with an acid, such as hydrochloric acid, which will not attack the typical helix material. The etching process can sometimes be facilitated by the use of a tubular supporting structure to permit better access of the solvent thereto.

In Figs. 1D and 2D, there are shown the finished assemblies for the two cases shown in Figs. 1A and 2A, respectively. It can be seen that the helix will be fused or locked with the envelope at points corresponding to those where the outside of the helix was not initially covered by the masking structure. In the case where the masking structure extended longitudinally the length of the helix, the helix will be supported by locking glass strips extending along its full length and integral with the main body of the envelope. In Fig. 1E, the helix is shown locked around its outer surface by the glass strip which is part of the inner surface of the envelope. The resultant unit can be used in a traveling wave tube as such, or the main body of the envelope can be trimmed so that there results a helix which is supported at points around its circumference by separate glass strips which extend along its full length.

It can be appreciated that the resultant unit provides a helix of a configuration which corresponds substantially exactly to that to which it was originally wound. At no stage in its manufacture, has the original configuration been materially disturbed and at all times there has been firm support therefor. The resultant unit comprises the helix and the tubular envelope coaxial with said helix, portions of the inner surface of the envelope being fused or locked with portions of the outer surface of the helix along its length. In this manner rigid support is provided and at the same time most of the helix remains transparent to electron flow therethrough.

If it is desired to have the outer surface of the helix in contact with the envelope around a complete circumference and at the same time, have the inner surface exposed, the process illustrated in Figs. 3A through 3D can be employed. As a temporary supporting structure, there is utilized a tubular rod 21 wherein there is cut a V-shaped thread 22 into which the helix 23 is wound as shown in Fig. 3B. No masking details are used but instead the glass envelope 24 fits closely over the helix 23. Then, as shown in Fig. 4, the glass envelope is evacuated and heated so that the softened glass is forced around the helix. To aid in holding larger diameter helices, grooves can be cut lengthwise in the tubular support to a depth slightly below the bottom of the thread. Glass can then surround the helix completely where the grooves are and will in this way lock it securely. Finally it is necessary to remove the support 21. The use of a tubular support facilitates the action of the etching solvent. In Fig. 3D, a longitudinal cross section is shown of the resultant.

After accurate and rigid helices are formed in this way, care must be taken to insure accurate alignment within the traveling wave tube envelope if the advantages made possible by this improved supporting method are to be fully realized. One possible technique for obtaining a high degree of alignment is to utilize as a reference surface a very accurate inner surface of the traveling wave tube envelope and to support a helix assembly of the kind described hereinabove within the tube envelope.

There are several ways known for obtaining accurate bore glass tubing which can be used in this way for insuring accurate alignment of the helix assembly. One possible method utilizes the glass shrinking technique which is part of the process set forth hereinabove. A mandrel having the configuration desired for the inner surface of the glass is enclosed in a closely fitting glass envelope. This envelope is evacuated and then heated until the glass softens sufficiently so that the pressure differential forces the glass envelope against the mandrel. After cooling, the glass is cut open at one end and the mandrel removed. The glass will then have an interior surface which conforms to the outer surface of the mandrel at the temperature at which the glass hardened. For simple shapes which can be withdrawn from the glass, a metal such as steel, whose temperature expansivity coefficient is greater than that of glass, can be used since it will shrink on cooling at a greater rate than the glass and when cold will be separate from it. For irregular shapes a metal such as Kovar which has the same temperature expansion characteristics as the glass is preferable. In this case, as in the process described for supporting the fine wire helices, the mandrel can be etched out by acid. Thereafter these accurately defined inner surfaces can be used as reference planes in the accurate alignment of the tube components in the tube envelope.

What is claimed is:

1. A method of constructing a helix assembly comprising winding wire in a helical configuration on a support, placing longitudinal masking details around the helix and the support for covering the major portion of the helix and the support and exposing narrow longitudinal strips thereof, enclosing the helix, the support and masking details in a closely fitting glass envelope, creating a pressure differential between the inside and outside of the envelope, softening the envelope while utilizing the pressure differential created to force the glass envelope along narrow longitudinal strips in contact with the exposed strips of the helix and the support for embedding the exposed wire into the narrow longitudinal glass strips, and removing the support and masking details.

2. A method for constructing a helix assembly comprising winding wire in a helical configuration on a support, placing a plurality of masking details around the helical wire and the support for covering the major portion of the helical wire and the support and exposing narrow longitudinal strips of the helical wire and the support between successive masking details, enclosing the helical wire, the support and masking details in a closely fitting glass envelope, creating a pressure differential between the inside and outside of the envelope, softening the envelope while utilizing the pressure differential created for forcing the glass envelope in narrow longitudinal strips between successive details into contact with the exposed strips of the helical wire and the support and embedding that portion of wire exposed therealong into the glass so forced, and dissolving the support and the masking details.

3. A method for constructing a helix assembly comprising winding wire in a helical configuration on a support, placing a plurality of masking details around the helical wire and the support for covering the major portion of the helical wire and the support and exposing narrow longitudinal strips of the helical wire and the support between successive masking details, enclosing the helical wire, the support and masking details in a closely fitting envelope of insulating material, creating a pressure differential between the inside and outside of the envelope, softening the envelope while utilizing the pressure differential created for forcing the envelope between successive masking details into narrow longitudinal strips in contact with the exposed strips of the helical wire and the support and embedding such portions of exposed helical wire into the narrow longitudinal insulating strips, and removing the support and masking details while leaving the helical wire supported by the insulating envelope.

References Cited in the file of this patent

UNITED STATES PATENTS 832,302    Ernst _____ Oct. 2, 1906

(Other references on following page)

UNITED STATES PATENTS

| | | |
|---|---|---|
| 838,423 | Kitsee | Dec. 11, 1906 |
| 845,413 | Haagn | Feb. 26, 1907 |
| 1,072,021 | McLaughlin | Sept. 2, 1913 |
| 1,395,963 | Kuppers | Nov. 1, 1921 |
| 1,582,683 | Harmon | Apr. 27, 1926 |
| 1,583,464 | Houskeeper | May 4, 1926 |
| 1,661,953 | McIntosh | Mar. 6, 1928 |
| 1,832,466 | Means | Nov. 17, 1931 |
| 2,131,887 | Friederich et al. | Oct. 4, 1938 |
| 2,200,939 | Trebbin et al. | May 14, 1940 |
| 2,266,349 | Wempe | Dec. 16, 1941 |
| 2,338,381 | Lohmann | Jan. 4, 1944 |
| 2,350,822 | Robinson | June 6, 1944 |
| 2,483,940 | Scott | Oct. 4, 1949 |
| 2,497,204 | Boterweg | Feb. 14, 1950 |

OTHER REFERENCES

Macht, abstract of application Ser. No. 769,849, published Aug. 2, 1949, 625 O. G. 250.